United States Patent
Rai

(10) Patent No.: US 8,520,254 B2
(45) Date of Patent: *Aug. 27, 2013

(54) METHODS AND SYSTEMS FOR PROCESSING A SET OF PRINT JOBS IN A PRINT PRODUCTION ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1804 days.

This patent is subject to a terminal disclaimer.

(21) Appl. No.: 11/779,437

(22) Filed: Jul. 18, 2007

(65) Prior Publication Data

US 2009/0025001 A1    Jan. 22, 2009

(51) Int. Cl.
*G06F 15/00*    (2006.01)

(52) U.S. Cl.
USPC .......................... 358/1.9; 358/1.13; 358/1.15

(58) Field of Classification Search
USPC .................................................. 358/1.1–1.16
See application file for complete search history.

(56) References Cited

U.S. PATENT DOCUMENTS

| | | | |
|---|---|---|---|
| 5,287,194 A * | 2/1994 | Lobiondo | 358/296 |
| 5,513,126 A | 4/1996 | Harkins et al. | |
| 6,970,261 B1 | 11/2005 | Robles | |
| 7,051,328 B2 | 5/2006 | Rai et al. | |
| 7,065,567 B1 | 6/2006 | Squires et al. | |
| 7,079,266 B1 | 7/2006 | Rai et al. | |
| 7,099,037 B2 * | 8/2006 | Clark et al. | 358/1.18 |
| 7,174,232 B2 * | 2/2007 | Chua et al. | 700/102 |
| 8,384,927 B2 | 2/2013 | Harmon et al. | |
| 2006/0262335 A1 * | 11/2006 | Varga | 358/1.15 |
| 2007/0046987 A1 * | 3/2007 | Shima | 358/1.15 |
| 2007/0070379 A1 | 3/2007 | Rai et al. | |
| 2007/0091355 A1 | 4/2007 | Rai | |
| 2008/0239366 A1 * | 10/2008 | Cyman et al. | 358/1.15 |

* cited by examiner

*Primary Examiner* — Benny Q Tieu
*Assistant Examiner* — Michael Y Tzeng
(74) *Attorney, Agent, or Firm* — Fox Rothschild LLP

(57) ABSTRACT

A system and method for routing and processing print jobs within a print job set considers the setup characteristics of each print job. Each print job set may be classified as a first job processing speed set, a second job processing speed set, or another job processing speed set based on the corresponding setup characteristics. First job processing speed sets are routed to a first group of print job processing resources, while second job processing speed sets are routed to a second group of print job processing speed resources. Each resource group may include an autonomous cell.

17 Claims, 5 Drawing Sheets

| JOB | FORM TYPE | INSERT TYPE |
|-----|-----------|-------------|
| J1  | A         | 1           |
| J2  | B         | 2           |
| J3  | A         | 4           |
| J4  | C         | 3           |
| J5  | C         | 2           |

FIG. 2

| JOB | FORM TYPE | INSERT TYPE |
|-----|-----------|-------------|
| J1  | A         | 1           |
| J2  | A         | 2           |
| J3  | B         | 1           |
| J4  | A         | 2           |
| J5  | A         | 1           |

FIG. 3

| JOB | FORM TYPE | INSERT TYPE |
|---|---|---|
| J1 | A | 1 |
| J2 | B | 2 |
| J3 | C | 2 |
| J4 | D | 2 |
| J5 | B | 1 |

| JOB | FORM TYPE | INSERT TYPE |
|---|---|---|
| J1 | A | 1 |
| J2 | B | 3 |
| J3 | B | 2 |
| J4 | A | 1 |
| J5 | B | 3 |

METHODS AND SYSTEMS FOR PROCESSING A SET OF PRINT JOBS IN A PRINT PRODUCTION ENVIRONMENT

REFERENCE TO RELATED APPLICATIONS

This application is related to U.S. patent application Ser. Nos. 11/779,454; 11/779,392; 11/779,418; 11/779,464; 11/779,494; 11/779,512; and 10/946,756 filed Sep. 22, 2004.

BACKGROUND

The disclosed embodiments relate generally to a method for operating a print processing system and, more specifically, to a method of partitioning a print job stream in a print production environment.

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Scheduling architectures that organize print jobs arriving at a document production environment and route the print jobs to autonomous cells are known in the art and are described in, for example, U.S. Pat. No. 7,051,328 to Rai et al. and U.S. Pat. No. 7,065,567 to Squires et al., the disclosures of which are incorporated by reference in their entirety.

It is common for print shops to receive a wide variety of print jobs from a variety of clients. Typically, each client has specific production requirements. Variation in these requirements can cause significant processing delays even when resources have been allocated to balance the job flow. Jobs, particularly print jobs, can have a number of different setup characteristics, and each setup characteristic may correspond to several different characteristic types. Significant setup delays can arise in processing jobs with variable setup characteristics in a production environment. Setup time can be particularly acute in production environments where substantial interruption in operation is unacceptable, such as environments that utilize continuous feed equipment. Setup delays can significantly impact throughput, particularly in light of the high processing rates of continuous feed equipment.

Transaction print environments that process jobs having a heavy-tailed job-size distribution tend to have inefficient job flows. This is because these environments typically handle very large and very small jobs that are all part of one job pool. It is likely that several small jobs may be delayed if they are queued behind a very large job. Similarly, large jobs can experience flow interruptions if several small jobs requiring multiple setups are ahead of the large jobs in the queue.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for processing a set of print jobs includes a set of one or more resources in a document production environment and a computer-readable storage medium having programming instructions for performing a method of processing a set of print jobs. The method includes providing a print job set made up of one or more print jobs, wherein each of the print jobs has one or more corresponding setup characteristics. The method also includes storing the print job set in a computer-readable storage medium, and identifying the print job set as either a first job processing speed set or a second job processing speed set based on the corresponding setup characteristics. If the print job set is a first job processing speed set, the method includes routing the print job set to a first subset of the set of one or more resources, wherein the first subset includes one or more first resources for processing the print job set. If the print job set is a second job processing speed set, the method includes routing the print job set to a second subset of the set of one or more resources, wherein the second subset includes one or more second resources for processing the print job set. The first subset may include a first autonomous cell, and the second subset may include a second autonomous cell.

The system also may include a workflow management system operable to coordinate a distribution of print jobs to the resources. Optionally, identifying the print job set may include one or more programming instructions for identifying the one or more setup characteristics, wherein each corresponding setup characteristic includes one or more types, such as a form type, an insert type, or both a form type and an insert type. For each corresponding setup characteristic, the method may include determining the number of corresponding types associated with the print job set. If, for each corresponding setup characteristic, the number of corresponding types associated with the print job set does not exceed a threshold value associated with the corresponding setup characteristic, the method may determine that the print job set is a first processing speed set. If the number of corresponding types of at least one setup characteristic associated with the print job set exceeds the threshold value associated with the corresponding setup characteristic, then the method may determine that the print job set is a second processing speed set.

Optionally, the system also may include one or more programming instructions for determining the threshold values using a simulation method, wherein the simulation method includes determining an optimal number of corresponding types for each corresponding setup characteristic. Determining an optimal number of corresponding types may include one or more programming instructions for determining an optimal number of corresponding types.

In an alternate embodiment, a system for processing a set of print jobs includes a set of one or more resources in a document production environment, a workflow management system operable to coordinate a distribution of print jobs to the resources, and a computer-readable storage medium having programming instructions for performing a method of processing a set of print jobs. The method may include providing a print job set made of one or more print jobs, wherein each of the print jobs has one or more corresponding setup characteristics. The method also may include storing the print job set in a computer-readable storage medium and identifying each print job set as a first job processing speed set, a second job processing speed set or a third job processing speed set based on the one or more corresponding setup characteristics. If the print job set is a first job processing speed set, the method may include routing the print job set to a first subset of the set of one or more resources, wherein the first subset comprises one or more first resources for processing the print job set. If the print job set is a second job processing speed set, the method may include routing the print job set to a second subset of the set of one or more resources, wherein the second subset comprises one or more second resources for processing the print job set. If the print job set is a third job processing speed set, the method may include routing the print job set to a third subset of the set of one or more resources, wherein the third subset comprises one or more third resources for processing the print job set. Optionally, the first subset includes a first autonomous cell, the second subset includes a second autonomous cell and the third subset includes a third autonomous cell.

Optionally, identifying the print job set includes one or more programming instructions for identifying the one or more corresponding setup characteristics, wherein each corresponding setup characteristic includes one or more types, such as a form type, insert type, or both a form type and insert type. For each corresponding setup characteristic, the method may include determining a number of corresponding types associated with the print job set. It may determine that the print set is a first processing speed set if, for each corresponding setup characteristic, the number of corresponding types does not exceed a first threshold value associated with the corresponding setup characteristic. It may determine that the print Job set is a second processing speed group if the number of corresponding types of at least one corresponding setup characteristic associated with the print job set exceeds a second threshold value associated with the corresponding setup characteristic. It may determine that the print job set is a third processing speed set if, for each corresponding setup characteristic, the number of corresponding types is greater than the first threshold value and less than the second threshold value. The system also may include programming instructions for determining the threshold values using a simulation method, wherein the simulation method determines an optimal number of corresponding types for each corresponding setup characteristic.

DESCRIPTION OF THE DRAWINGS

FIG. 2 depicts a set of print jobs, setup characteristics and corresponding types according to an embodiment.

FIG. 3 depicts a fast job set according to an embodiment.

FIG. 4 depicts a slow job set according to an embodiment.

FIG. 5 depicts an intermediate job set according to an embodiment.

DETAILED DESCRIPTION

For purposes of the discussion below, a "print shop" refers to an entity that includes a plurality of document production resources, such as printers, cutters, collators and the like. The print shop may be a freestanding entity, including one or more print-related devices, or it may be part of a corporation or other entity. Additionally, the print shop may communicate with one or more servers by way of a local area network or a wide area network, such as the Internet or the World Wide Web.

A "job" refers to a logical unit of work that is to be completed for a customer. A job may include one or more print jobs from one or more clients. A production system may include a plurality of jobs. Although the disclosed embodiments pertain to document production systems, the disclosed methods and systems can be applied to production systems in general.

A "print job" refers to a job processed in a document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

Figure 1:
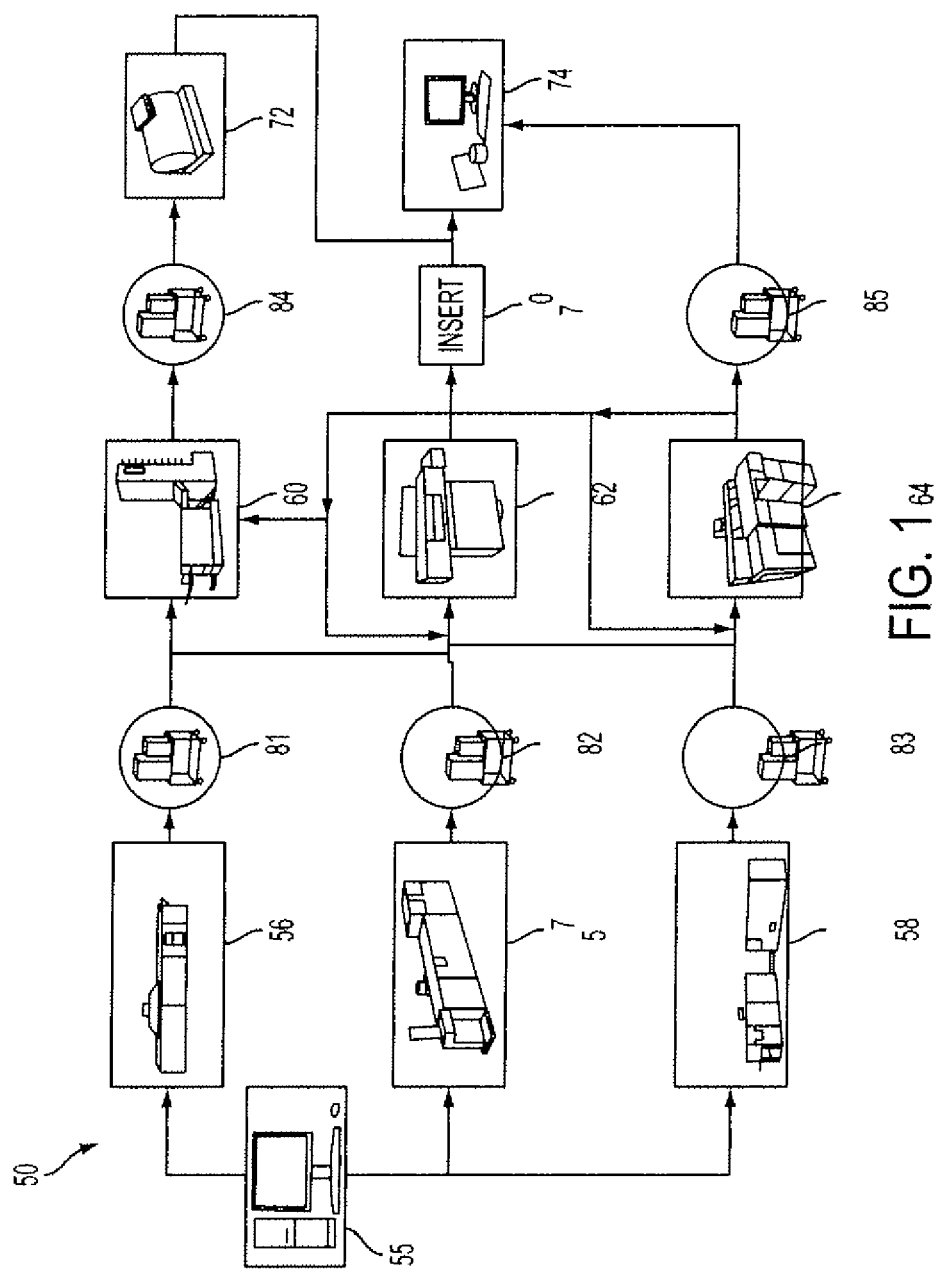
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Production environments may receive a wide variety of jobs from numerous clients. Partitioning jobs based on an attribute of the setup characteristics may improve processing efficiency in a production environment. In an embodiment, jobs received by a production environment may be sorted based on a setup characteristic attribute before being processed in order to better optimize the job flow. A setup characteristic may include a feature of any step in the production process. For example, in a document production system, the printer setup may be dependent on the type of form used. Alternatively, the insertion operation setup may depend on one or more inserts associated with each job.

In an embodiment, each setup characteristic may be associated with one or more types. For example, in a document production system, form type may be an example of a setup characteristic. A form type setup characteristic may be associated with three types of forms: form A, form B and form C. As such, in this example, form A, form B and form C may be the types associated with the form type setup characteristic.

In an embodiment, a job stream may be categorized based on the number of types associated with each setup characteristic. For example, in a document production environment, a set of print jobs may be received. A set of print jobs may include one or more print jobs. In an embodiment, a set of print jobs may include a one or more print jobs which may have a common characteristic, such as belonging to the same client or the like. The set of print jobs may be associated with two setup characteristics, such as form type and insert type.

As illustrated by FIG. 2, a set of jobs may include five print jobs, jobs J1-J5 200 and each job may be associated with a form type setup characteristic 205 and an insert type characteristic 210. For example, job J1 215 may be associated with form type A and insert type 1, while job J2 220 may be associated with form type B and insert type 2.

In an alternate embodiment, job sets may be categorized based on the average number of types associated with each setup characteristic over a specified interval. For example, a job set may have an average of two form types per day.

In an embodiment, a threshold value may be determined for each setup characteristic. The threshold value may represent the number of types associated with each setup characteristic that may be necessary to optimize job flow. The threshold value may be determined using a simulation model, such as a model based on discrete event simulation, to simulate and optimize the workflow. A simulation-based approach may be used to determine an optimal number of types for each setup characteristic by using manual iteration until an improved solution is obtained. Alternatively, formal optimization techniques may be used. If formal optimization techniques are used, the threshold parameters may be specified as variables and a performance measure, such as the total number of late jobs, total production cost or the like, of the overall print shop may be used as an objective function to be optimized. Constraint functions may also be specified in addition to constraints on variables. Threshold parameters may then be determined via an optimization of the simulation model. Several techniques, such as mixed-integer programming, simulated annealing, genetic programs and the like can be used to perform the optimization that may include discrete and continuous decision variables.

In an embodiment, a set of jobs may be categorized based on a comparison between the number of types associated with each setup characteristic for the set of jobs and the threshold value for each setup characteristic. For example, if the threshold value associated with form type is '2' and the threshold value associated with insert type is '3', a job set having two or fewer form types and three or fewer insert types may be identified as a first job processing speed set, such as a fast job set or the like. A fast job set may include jobs that have low setup requirements when compared to the thresholds associated with the setup requirements. For example, a fast job set may include print jobs with substantially similar setup requirements which may ease transitioning from one job to the next.

A set of jobs having more than two form types and/or more than three insert types may be identified as a second job processing speed set, such as a slow job set or the like. A slow job set may include jobs that have high setup requirements when compared to the thresholds associated with the setup requirements. For example, a slow job set may include print jobs with substantially different setup requirements which may cause significant delays in transitioning from one job to the next.

FIG. 3 illustrates categorizing a set of jobs 300, J1-J5, in this manner. As illustrated in FIG. 3, the set of jobs 300 utilizes two form types (i.e., form type A and form type B) and two insert types (i.e., insert type 1 and insert type 2), Because the number of form types associated with the set of jobs 300 equals the form type threshold value (i.e., 2) and because the number of insert types associated with the set of Jobs is less than the insert type threshold value (i.e., 3), the set of jobs 300 may be identified as a fast job set.

In comparison, as illustrated by FIG. 4, the set of jobs 400, J1-J5, utilizes four form types (i.e., form type A, form type B, form type C and form type D) and two insert types (i.e., insert type 1 and insert type 2). Even though the number of insert types associated with the set of jobs 400 (i.e., 2) is less than the threshold value associated with the insert type setup characteristics (i.e., 3), the set of jobs 400 may be identified as a slow job set because the number of form types associated with the set of jobs 400 (i.e., 4) exceeds the threshold value associated with the form type setup characteristic (i.e., 2).

In an alternate embodiment, a set of jobs may be grouped based on different threshold conditions. For example, a set of jobs may be identified as a fast job set if the number of types associated with one setup characteristic is less than the threshold value associated with that setup characteristic. For example, a set of jobs may be identified as a fast job set if the number of form types associated with the jobs is less than or equal to the threshold value associated with the form type characteristic. Referring back to FIG. 2, if the form type threshold value is 4, then the set of jobs 200 may be identified as a fast job set because the set of jobs 200 utilizes three form types which is less than the threshold value associated with the form type characteristic.

In another embodiment, sets of jobs may be identified according to a plurality of thresholds associated with the same setup characteristic. For example, a set of jobs having a number of types less than a first threshold value, but more than a second threshold value may be grouped in a third job processing speed set, such as an intermediate job set or the like. FIG. 5 illustrates a set of jobs 500, J1-J5, having a form type setup characteristic 505 and an insert type setup characteristic 510. The first threshold value associated with the form type setup characteristic may be '3', and the second threshold value associated with the form type setup characteristic may be '1'. Similarly, the first setup characteristic associated with the insert type setup characteristic may be '4', and the second threshold value associated with the insert type setup characteristic may be '2'. The set of jobs 500 utilizes two form types (i.e., form type A and form type B) which is between the first threshold value (i.e., 3) and the second threshold value (i.e., 1) associated with the form type characteristic. The set of jobs also utilizes three insert types (i.e. insert type 1 insert type 2 and insert type 3) which is between the first threshold value (i.e., 4) and the second threshold value (i.e., 2) associated with the insert type characteristic.

In an embodiment, a set of one or more resources may process each set of print jobs. In a document production environment, a resource is a device that performs a processing function on a print job. For example, a resource may include a printer, a copier, a binder, a hole-punch, a collator, a sealer or any other equipment used to process print jobs. A set of resources may include one or more subsets of resources for processing a set of print jobs. For example, a first subset of resources may include resources necessary to process a first set of print jobs, such as a fast job set or the like.

In an embodiment, a set of resources may include an autonomous cell. An autonomous cell may refer to a group of resources used to process at least one job set. A resource may be a device configured to process one or more jobs. The quantity and type of resources that are included in each autonomous cell may be determined by utilizing simulation models that examine the workflow characteristics of the jobs in each set of jobs, as well as other factors such as job size, arrival time, due dates and like. Although the processing steps for a slow job set and a fast job set may be the same, for example, both print the corresponding jobs and add inserts, the characteristics of the autonomous cells may be significantly different for slow job sets and fast job sets.

In an embodiment, the job set may be routed to one or more subsets of resources. For example, a slow job set may be routed to a specific subset of resources, such as an autonomous cell, for processing. Similarly, an intermediate job set may be routed to another subset of resources for processing, while a fast job set may be routed to yet another subset of resources for processing.

Figure 6:
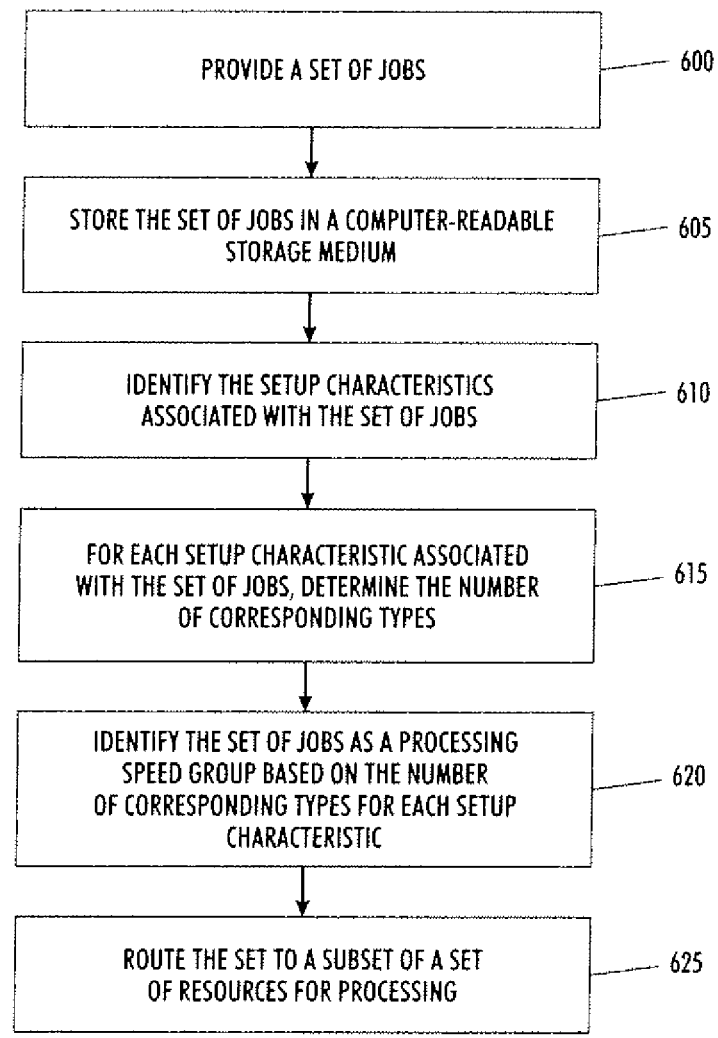
FIG. 6 depicts an exemplary flow chart of a process of partitioning a job stream according to an embodiment.

FIG. 6 illustrates an exemplary flow chart of a process of partitioning a job stream according to an embodiment. A set of jobs may be provided 600, and the set of jobs may be stored 605 in a computer-readable storage medium, such as RAM, ROM or the like. The setup characteristics associated with the plurality of jobs may be identified 610, and for each setup characteristic associated with the set of jobs, the number of corresponding types may be determined 615. A set of jobs may be identified 620 based on the number of corresponding types for each characteristic. The set may be routed 625 to a subset of a set of resources for processing.

Figure 7:
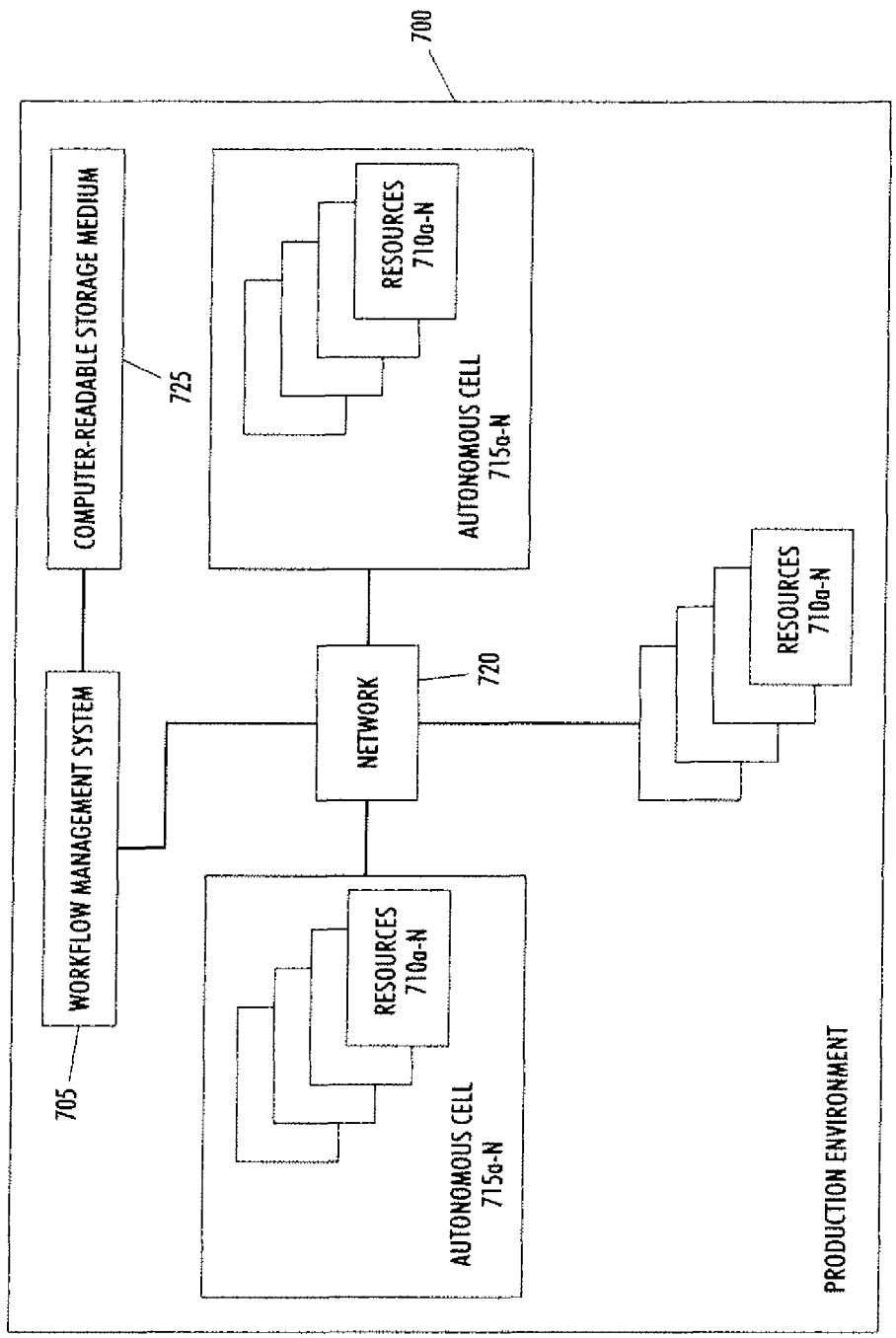
FIG. 7 depicts an environment suitable for processing a plurality of jobs according to an embodiment.

FIG. 7 depicts an exemplary environment suitable for practicing the illustrative embodiments. The production environment 700 may include a workflow management system 705 that is responsible for managing workflow in the production environment 700 and a computer-readable storage medium 725. The production environment 700 may also include resources 710a-N such as a printer, a copier, a binder, a hole-punch, a collator, a sealer or any other equipment used to process jobs. The resources may be grouped into autonomous cells 715a-N such that each autonomous cell 715a-N includes one or more resources 710a-N necessary to process at least one job. The workflow management system 705 may be implemented on a stand-alone computer system or may be integrated into the resources. The workflow management system 705 may also be implemented by distributed components such as separate electronic devices. A network 720 may interconnect the resources 710a-N with the workflow management system 705, as illustrated in FIG. 7. The network 720 may include a local area network (LAN) or a wide area network (WAN) such as the Internet or the World Wide Web. The network may also be formed by communication links that interconnect the workflow management system 705 and the resources 710a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for processing a set of print jobs, the system comprising:
   a set of one or more resources in a document production environment; and
   a non-transitory computer-readable storage medium comprising one or more programming instructions for performing a method of processing a set of print jobs, the method comprising:
      providing a print job set comprising one or more print jobs, wherein each of the one or more print jobs has one or more corresponding setup characteristics, wherein each of the one or more setup characteristics comprise a feature of a production process associated with the one or more print jobs,
      storing the print job set in a computer-readable storage medium,
      identifying the print job set as one of a first job processing speed set and a second job processing speed set based on the corresponding setup characteristics including at least one of the features of the production process,
      if the print job set is a first job processing speed set, routing the print job set to a first subset of the set of one or more resources, wherein the first subset comprises one or more first resources for processing the print job set, and
      if the print job set is a second job processing speed set, routing the print job set to a second subset of the set of one or more resources, wherein the second subset comprises one or more second resources for processing the print job set.

2. The system of claim 1, wherein the first subset comprises a first autonomous cell and the second subset comprises a second autonomous cell.

3. The system of claim 1 further comprising: a workflow management system operable to coordinate a distribution of print jobs to the resources.

4. The system of claim 1, wherein identifying the print job set comprises one or more programming instructions for:
   identifying the one or more setup characteristics, wherein each corresponding setup characteristic comprises one or more types;
   for each corresponding setup characteristic, determining the number of corresponding types associated with the print job set;
   determining that the print job set is a first processing speed set if, for each corresponding setup characteristic, the number of corresponding types associated with the print job set does not exceed a threshold value associated with the corresponding setup characteristic; and
   determining that the print job set is a second processing speed set if the number of corresponding types of at least one setup characteristic associated with the print job set exceeds the threshold value associated with the corresponding setup characteristic.

5. The system of claim 4, further comprising one or more programming instructions for: determining the threshold values using a simulation method, wherein the simulation method comprises determining an optimal number of corresponding types for each corresponding setup characteristic.

6. The system of claim 1, wherein the one or more setup characteristics comprises a form type setup characteristic, an insert type setup characteristic, or both a form type setup and an insert type setup characteristic.

7. The system of claim 1, wherein the print job set comprises one or more print jobs from a same client.

8. A system for processing a set of print jobs, the system comprising:
   a set of one or more resources in a document production environment;
   a workflow management system operable to coordinate a distribution of print jobs to the resources; and
   a non-transitory computer-readable storage medium comprising one or more programming instructions for performing a method of processing a set of print jobs, the method comprising:
      providing a print job set comprising one or more print jobs, wherein each of the one or more print jobs has one or more corresponding setup characteristics, wherein each of the one or more setup characteristics comprise a feature of a production process associated with the one or more print jobs, storing the print job set in a computer-readable storage medium, identifying each print job set as a first job processing speed set, a second job processing speed set or a third job processing speed set based on the one or more corresponding setup characteristics by:
   for each corresponding setup characteristic, determining a number of corresponding types associated with the setup characteristic,
   determining that the print set is a first processing speed set if, for each corresponding setup characteristic, the number of corresponding types does not exceed a first threshold value associated with the corresponding setup characteristic,
   determining that the print job set is a second processing speed group if the number of corresponding types of at least one corresponding setup characteristic associated with the print job set exceeds a second threshold value associated with the corresponding setup characteristic, and
   determining that the print job set is a third processing speed set if, for each corresponding setup characteristic, the number of corresponding types is greater than the first threshold value and less than the second threshold value;

if the print job set is a first job processing speed set, routing the print job set to a first subset of the set of one or more resources, wherein the first subset comprises one or more first resources for processing the print job set, if the print job set is a second job processing speed set, routing the print job set to a second subset of the set of one or more resources, wherein the second subset comprises one or more second resources for processing the print job set, and if the print job set is a third job processing speed set, routing the print job set to a third subset of the set of one or more resources, wherein the third subset comprises one or more third resources for processing the print job set.

9. The system of claim 8, wherein the first subset comprises a first autonomous cell, the second subset comprises a second autonomous cell and the third subset comprises a third autonomous cell.

10. The system of claim 8, further comprising one or more programming instructions for: determining the threshold values using a simulation method, wherein the simulation method comprises determining an optimal number of corresponding types for each corresponding setup characteristic.

11. The system of claim 8, wherein the one or more setup characteristics comprises a form type setup characteristic, an insert type setup characteristic, or both a form type setup and an insert type setup characteristic.

12. The system of claim 8, wherein the print job set comprises one or more print jobs from a same client.

13. A computer-implemented method for processing a set of print jobs, the method comprising:
   providing a print job set comprising one or more print jobs, wherein each of the one or more print jobs has one or more corresponding setup characteristics, wherein each of the one or more setup characteristics comprise a feature of a production process associated with the one or more print jobs;
   storing the print job set in a non-transitory computer-readable storage medium;
   identifying the print job set as one of a first job processing speed set and a second job processing speed set based on the corresponding setup characteristics, wherein identifying the print job set comprises:
      identifying the one or more setup characteristics, wherein each corresponding setup characteristic comprises one or more types, for each corresponding setup characteristic, determining the number of corresponding types associated with the print job set,
      determining that the print job set is a first processing speed set if, for each corresponding setup characteristic, the number of corresponding types associated with the print job set does not exceed a threshold value associated with the corresponding setup characteristic, and
      determining that the print job set is a second processing speed set if the number of corresponding types of at least one setup characteristic associated with the print job set exceeds the threshold value associated with the corresponding setup characteristic;
   if the print job set is a first job processing speed set, routing the print job set to a first subset of the set of one or more resources wherein the first subset comprises one or more first resources for processing the print job set; and
   if the print job set is a second job processing speed set, routing the print job set to a second subset of the set of one or more resources, wherein the second subset comprises one or more second resources for processing the print job set.

14. The method of claim 13, wherein the first job processing speed set comprises a fast job set and the second job processing speed set comprises a slow job set.

15. The method of claim 13, further comprising: determining the threshold values using a simulation method, wherein the simulation method determines an optimal number of corresponding types for each corresponding setup characteristic.

16. The method of claim 13, wherein the one or more setup characteristics comprises a form type setup characteristic, an insert type setup characteristic, or both a form type setup characteristic and an insert type setup characteristic.

17. The method of claim 13, wherein the print job set comprises one or more print jobs from a same client.

* * * * *